United States Patent [19]

Acampora et al.

[11] Patent Number: 4,760,570
[45] Date of Patent: Jul. 26, 1988

[54] N-BY-N "KNOCKOUT" SWITCH FOR A HIGH-PERFORMANCE PACKET SWITCHING SYSTEM

[75] Inventors: Anthony Acampora, Freehold; Michael G. Hluchyj, Little Silver; Yu S. Yeh, Freehold, all of N.J.

[73] Assignee: American Telephone & Telegraph Company, AT&T Bell Laboratories, Murray Hill, N.J.

[21] Appl. No.: 65,688

[22] Filed: Jun. 19, 1987

Related U.S. Application Data

[63] Continuation-in-part of Ser. No. 893,617, Aug. 6, 1986, abandoned.

[51] Int. Cl.$^4$ .......................................... H04Q 11/04
[52] U.S. Cl. ...................................................... 370/60
[58] Field of Search ........................................ 370/60, 94

[56] References Cited

U.S. PATENT DOCUMENTS

| | | | |
|---|---|---|---|
| 4,058,672 | 11/1977 | Crager et al. | 178/3 |
| 4,312,065 | 1/1982 | Ulug | 370/94 |
| 4,456,989 | 6/1984 | Johnson et al. | 370/94 |
| 4,486,878 | 12/1984 | Havermans | 370/60 |
| 4,577,308 | 3/1986 | Larson et al. | 370/9 |
| 4,607,363 | 8/1986 | Platel et al. | 370/94 |

OTHER PUBLICATIONS

Inose, An Introduction to Digital Integrated Communication Systems, U. of Tokyo Press, 1979, pp. 87, 91–96, 103–145, 149–155, 163–186.
Inukai, IEEE, Trans. Comm., vol. COM-27, No. 10, Oct. 1979, pp. 1449–1455.
Dias et al., Globecom '84, Nov. 1984, Atlanta, Ga., pp. 5.2.1–5.2.7.
Lim, IEEE IFOCOM '85, Mar. 26–28, 1985, Washington, D.C., pp. 4–9.
Daigle et al., IEEE INFOCOM '85, Mar. 26–28, 1985, Wash., D.C., pp. 18–26.

*Primary Examiner*—Douglas W. Olms
*Assistant Examiner*—Wellington Chin
*Attorney, Agent, or Firm*—Erwin W. Pfeifle

[57] ABSTRACT

The present invention relates to an N-input, N-output "Knockout" packet switch (11) which uses decentralized control and distributed routing. More particularly, within the switch, the N input signals comprising fixed-length packets propagate along separate broadcast buses (14) to each of N bus interface units (15) which include N packet filters (20), a concentrator (21) and a shared buffer (22). Each bus interface unit is associated with a separate one of the N outputs (12) of the switch, and the N packet filters therein are each associated with a separate one of the N broadcast buses for detecting if a packet on the associated bus is destined for the associated switch output. The concentrator is used to reduce the number of separate buffers needed to receive packets which may arrive simultaneously and are destined for the associated output. Contending packets at the output of the concentrator are stored in the shared buffer before placement on the output line on a first-in, first-out basis. The lost packet rate of the "Knockout" switch can be made as small as desired and latency of packets in the switch is the smallest achievable by any comparable switch.

12 Claims, 9 Drawing Sheets

N-BY-N "KNOCKOUT" SWITCH FOR A HIGH-PERFORMANCE PACKET SWITCHING SYSTEM

This application is a continuation-in-part, application Ser. No. 893,617, filed Aug. 6, 1986 now abandoned.

TECHNICAL FIELD

The present invention relates to a switching arrangement for routing high-speed, time multiplexed, fixed-length packets of information from N inputs to N outputs in a high-performance packet switching system. More particularly, the present switch uses distributed control and a fully interconnectable configuration to route arriving fixed-length packets to their appropriate outputs using a single stage of switching which includes a minimum amount of buffering and provides the lowest packet latency in any switching arrangement.

DESCRIPTION OF THE PRIOR ART

Every type of communication network interconnecting more than two users depends on some form of switching to efficiently route information among the various users. In such switches, the traffic presented at two or more inputs may be destined for a common output. There are basically only two ways that such a situation can be managed.

First, the switch may require a controller that schedules the arrivals of packets to avoid conflict. The classic Time-Space-Time switch shown in FIG. 3.6 at page 95 of the book by H. Inose entitled "An Introduction To Digital Integrated Communications Systems", University of Tokyo Press, Tokyo, Japan, 1979 falls into this category. There, each input to the switch is preceded by a Time Slot Interchange to rearrange the time sequence of the time-multiplexed traffic so that, when presented to the switch, the data appearing at the N inputs are, at all times, destined for distinct separate outputs. However, scheduling is a difficult task, as shown by T. Inukai in *IEEE Transactions on Communications*, Vol. COM-27. No. 10, October 1979 at pages 1449–1455 and, although feasible and adequate for circuit switching, requires too much time to determine permissible input-/output combinations to be applicable for packet switching.

The second way, and perhaps the more attractive approach for managing contention, employs decentralized control and distributed routing wherein each packet or burst of traffic contains a header bearing the destination port of the switch for that packet, where the header is used in routing the packet through the switch. Without the coordination afforded by the central scheduler, the switch must now recognize conflict among its inputs and internally store, or buffer, all but at most one of several simultaneous arriving packets destined for a common output, thereby leading to statistical delay, or latency, within the switch. Such self-scheduling switches, as shown in the article by D. M. Dias et al. in GLOBECOM '84, Vol. 1, Atlanta, Ga., Nov. 26–29, 1984, pages 5.2.1–5.2.7, typically employ binary switching elements appropriately interconnected and arranged to form a multistage switch. These switches have tended to emphasize a reduction in the number of switch elements needed to a value below that of a fully connected arrangement, one wherein each input has a dedicated path to each output and thereby requiring $N^2$ elements. In addition to congestion at the outputs, these element-efficient switches can also congest at each of the binary switch points, thereby requiring that additional measures be taken, such as buffering within each element. Because these autonomous buffers cannot be shared among elements, the complexity of the buffering is typically much greater than that of the binary switching elements themselves. Moreover, the delay encountered within the network is greater than the unavoidable component caused by destination congestion alone.

The problem remaining in the prior art is to provide a switch which can be used for packet switching and avoids (1) the scheduling problems encountered with switches requiring controllers, and (2) the buffering complexity and delays encountered by the decentralized control and distributed routing switches.

SUMMARY OF THE INVENTION

The foregoing problem in the prior art has been solved in accordance with the present invention which relates to a switching arrangement for routing high-speed, time multiplexed fixed-length packets of information from N inputs to N outputs in a high-performance packet switching system. The present switch uses distributed control and a fully interconnectable configuration to passively route arriving fixed-length packets to their appropriate outputs using a single stage of switching.

It is an aspect of the present invention to provide a switching arrangement for routing multiple simultaneous high-speed, time-multiplexed fixed-length packets of information from the N inputs to the N outputs using decentralized control and distributed routing. The switching arrangement comprises two basic characteristics: (1) each input has a separate broadcast bus, and (2) each output has access to the packets of information arriving on all inputs. More particularly, each output passively interfaces to the complete set of N input buses and provides several important features. First, no switch blocking occurs where packets destined for one output interfere with packets going to other outputs. Second, the broadcast buses can reside on an equipment backplane with the circuitry for each of the N input-/output pairs placed on a single plug-in circuit card. Third, with each bus being driven by only one input it allows for a higher transmission rate on the buses than found with a shared parallel bus accessed by all inputs. Lastly, since every input is available at the interface to every output, arriving packets can be addressed to, and received by, multiple outputs and thereby lends itself to broadcast and multicast features.

It is a further aspect of the present invention to provide a "Knockout" switching arrangement for routing high-speed, time-multiplexed fixed-length packets of information from N inputs to N outputs using decentralized control and distributed routing. Structurally, the N input signals are propagated along separate buses to each of N bus interface units which include N packet filters, a concentrator and a shared buffer. Each bus interface unit is associated with a separate one of the N outputs, and the N packet filters therein are each associated with a separate one of the N buses for detecting if a packet on the associated bus is destined for the associated output. The concentrator is used at each output to reduce the number of separate buffers needed to receive simultaneously arriving packets. The contending packets are stored in the shared buffer before placement on the output line on a first-in, first-out basis.

Other and further aspects of the present invention will become apparent during the course of the following description and by reference to the accompanying drawings.

BRIEF DESCRIPTION OF THE DRAWINGS

Referring now to the drawings in which like numerals represent like parts in the several views.

DETAILED DESCRIPTION

The switching arrangement in accordance with the present invention includes an N-input, N-output packet switch using decentralized control and distributed routing with all inputs and outputs operating at the same bit rate. Fixed-length packets arrive at the N inputs $10_1$ to $10_N$ of the present N-by-N switch 11 in a time-slotted manner in which each input includes packets having destinations as determined by the individual remote N transmitters sending the packets, as shown in the exemplary sequences shown in FIG. 1. Each packet in such arrangement contains, somewhere therein, the address of its destination output as shown in the exemplary packet format of FIG. 3.

Figure 1:
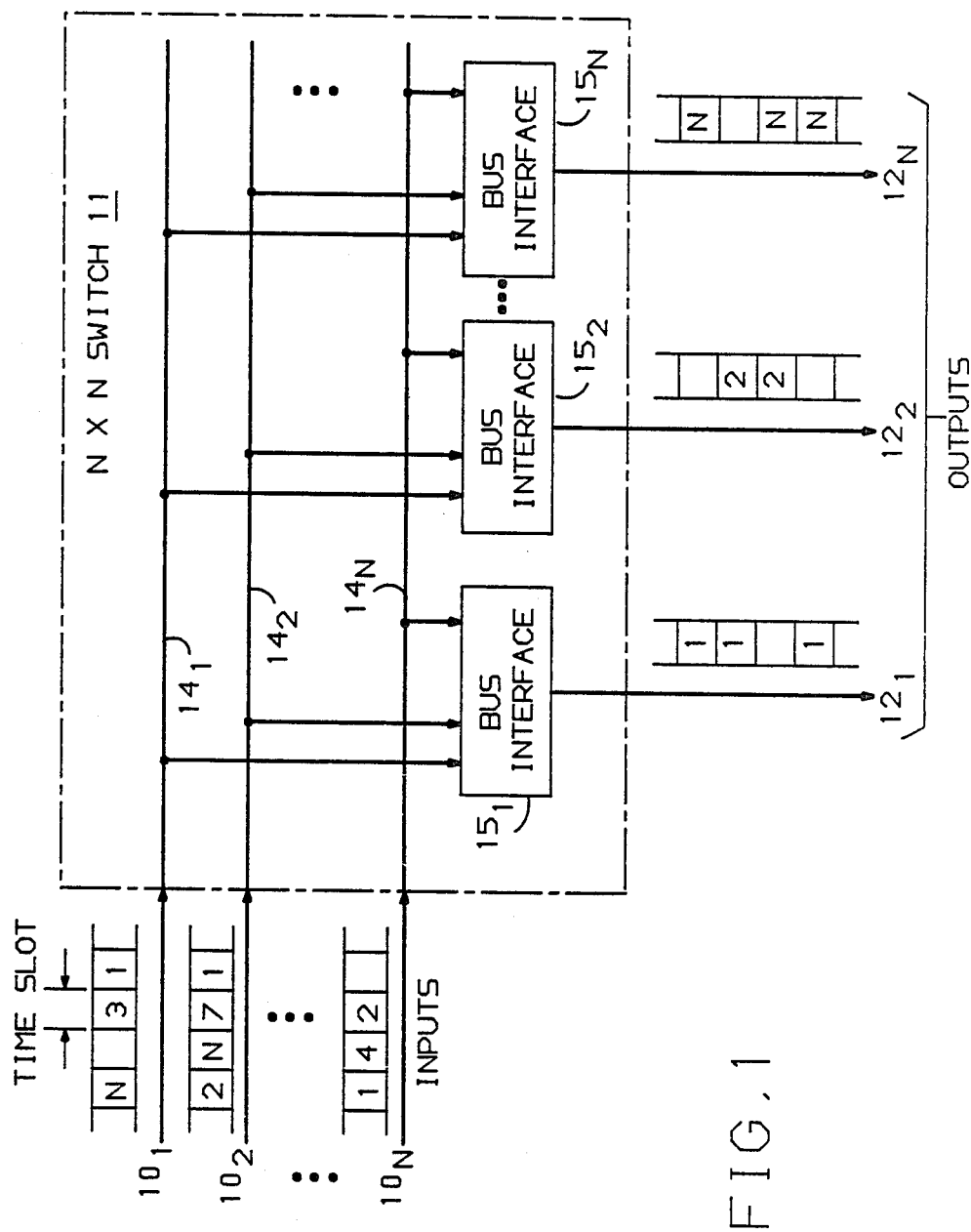
FIG. 1 illustrates a block diagram of an N-input, N-output time slotted packet switching arrangement in accordance with the present invention including typical fixed length packets arriving in a time-slotted sequence at the N inputs and routed to the appropriate N outputs.

Aside from having control over the average number of packet arrivals destined for a given output, no control over the specific arrival times of packets on the inputs and their associated output addresses is assumed. In other words, there is no time-slot specific scheduling that prevents two or more packets from arriving at different inputs in the same time slot and destined for the same output, as shown in FIG. 1 for the first arriving time slot for inputs $10_1$ and $10_2$ which are both destined for output $12_1$. The addressing information is used by N-by-N packet switch 11 to route the incoming packets to their appropriate outputs $12_1$ to $12_N$. Hence, to avoid lost packets, or at least provide a sufficiently small probability thereof, at a minimum, packet buffering must be provided in switch 11 to smooth fluctuations in packet arrivals destined for the same output.

The interconnection arrangement for N-by-N packet switch 11 has two basic characteristics: (1) each input $10_1$ to $10_N$ is associated with a separate broadcast bus $14_1$ to $14_N$, respectively, and (2) each output $12_1$ to $12_N$ has access to all packets arriving on all inputs. As shown in FIG. 1, packets arriving at each of the N inputs $10_i$ are placed directly on a separate broadcast bus $14_i$, and each output $12_1$ to $12_N$ passively interfaces to the complete set of N buses 14 via a separate bus interface unit $15_1$ to $15_N$, respectively. This simple structure provides several important features. First, with each input having a direct path to every output, no switch blocking occurs where packets destined for one output interfere (i.e., delay or block) with packets going to other outputs. The only congestion in the switch takes place at the bus interface unit $15_i$ to each output $12_i$, where packets can arrive simultaneously on different input lines 10 destined for the same output $12_i$. Without a priori scheduling of packet arrivals, this type of congestion is unavoidable, and dealing with it typically represents the greatest source of complexity within a packet switch. This complexity is minimized by the present N-by-N packet switching arrangement 11.

The broadcast bus structure of FIG. 1 has the desirable characteristic that each bus $14_i$ is driven by only one input $10_i$. This allows for a higher transmission rate on the buses and a design more tolerant of faults compared with a shared parallel bus accessed by all inputs. In addition, the packet buffering and bus access control circuitry of the known shared parallel bus architecture is replaced in the present switch 11 by, at most, an elastic buffer at each input which is used to synchronize the time slots from the individual input lines.

Figure 2:
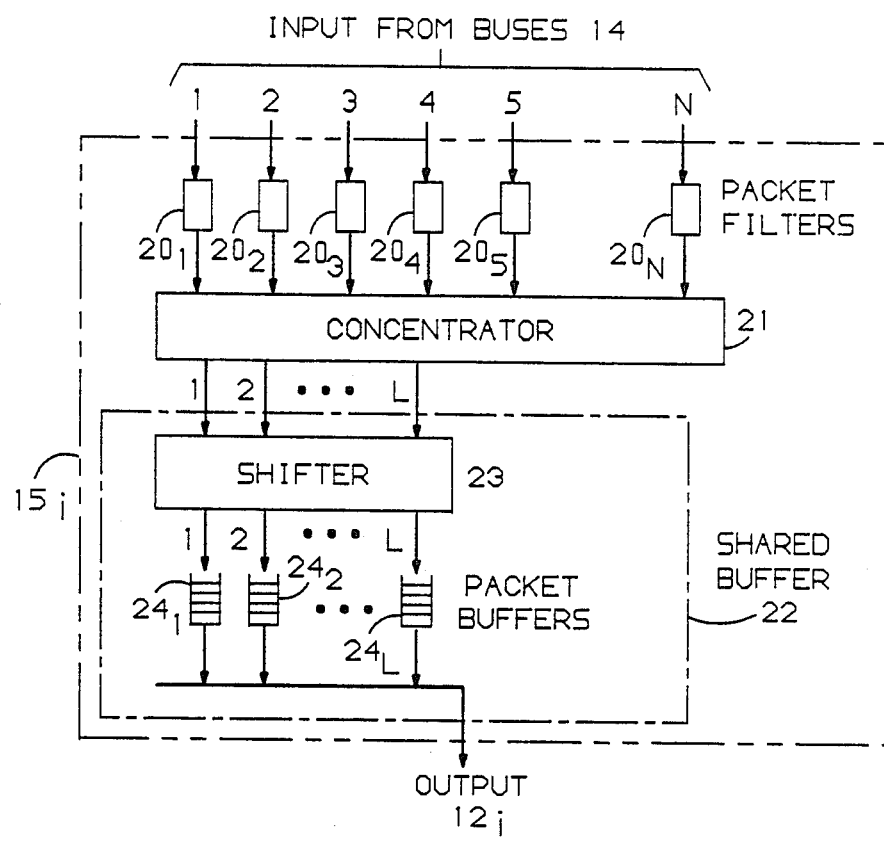
FIG. 2 is a block diagram of one of the N bus interface units of the switching arrangement of FIG. 1.

FIG. 2 is a block diagram of an exemplary bus interface unit $15_i$ associated with each output $12_i$ of N-by-N packet switch 11. The bus interface unit $15_i$ shown has three major components. First there is a row of N packet filters $20_1$ to $20_N$, with each packet filter receiving the packets propagating on a separate one of broadcast buses $14_1$ to $14_N$. In each packet filter $20_i$, the address of every packet broadcast on the associated broadcast bus $14_i$ is examined, with packets addressed to the associated output of switch 11 being allowed to pass through packet filter $20_i$ while all other packets are blocked. A concentrator 21 receives the outputs of all associated packet filters $20_1$ to $20_N$ at separate inputs and achieves an N-to-L (L≦N) concentration of the input lines, where up to L packets making it through the packet filters in each time slot emerge at the L outputs of concentrator 21. These L concentrator outputs then enter a shared buffer 22 comprising a shifter 23 and a plurality of L First-In, First-Out (FIFO) buffers $24_1$ to $24_L$. The structure of shared buffer 22 allows complete sharing of the L FIFO buffers and provides the equivalent of a single queue with L inputs and one output, operating under a first-in, first-out queuing discipline.

Figure 3:
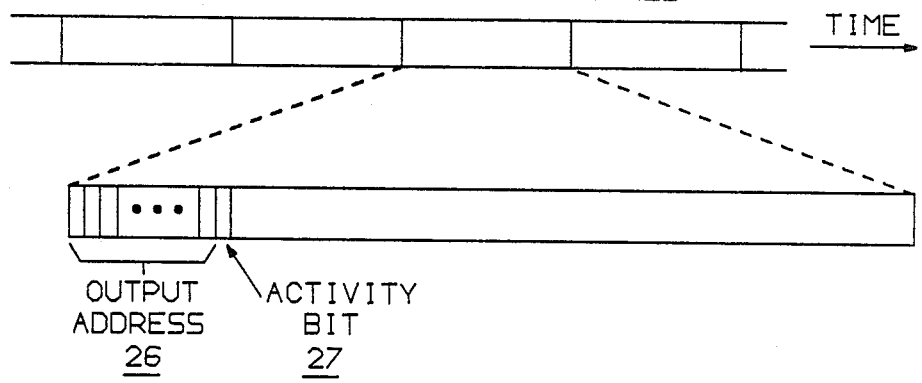
FIG. 3 illustrates an exemplary packet format for transmission through the switching arrangement of FIG. 1.

FIG. 3 shows the format of the packets as they enter the packet filters $20_1$ to $20_N$ from the broadcast buses $14_1$ to $14_N$, respectively. The preamble of each packet preferably contains the address 26 associated with the output on packet switch 11 for which the packet is destined, followed by a single activity bit 27. The destination output address 26 contains $\log_2 N$ bits with each output $12_1$ to $12_N$ having a unique address. The activity bit 27 indicates the presence (logic 1) or absence (logic 0) of a packet in the arriving time slot and plays an important role in the operation of concentrator 21.

Figure 4:
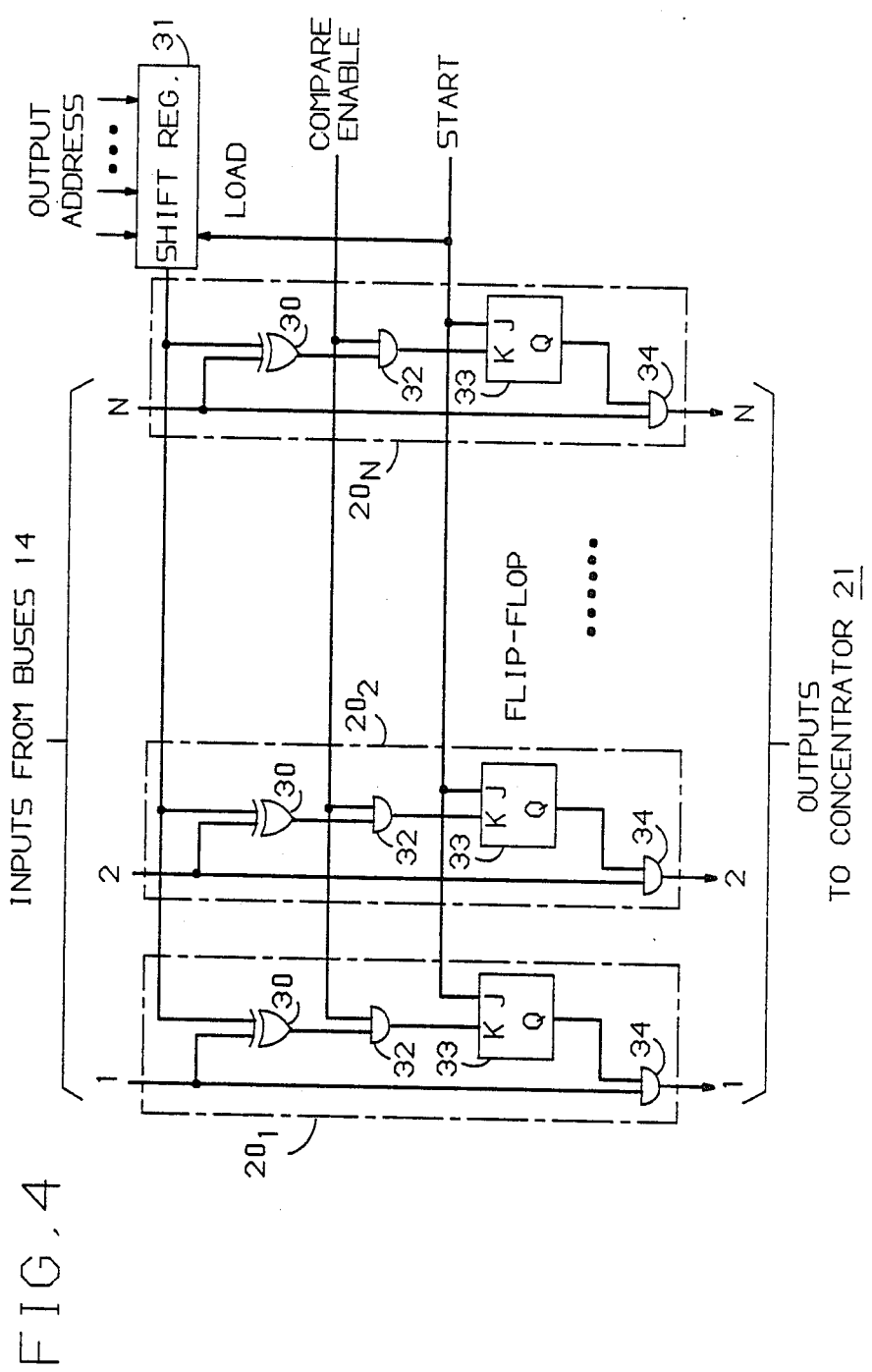
FIG. 4 is a circuit diagram of an exemplary arrangement of the N packet filters associated with each one of the bus interface units shown in FIG. 2.

FIG. 4 shows exemplary components for each of the packet filters $20_i$. Each packet filter $20_i$ comprises an Exclusive-Or (EX-OR) gate 30 which has one input from the associated broadcast bus $14_i$ and the other input from a shift register 31 which is common to a bus interface unit $15_i$ and stores the unique address for that bus interface unit. The output from each EX-OR gate 30 provides one input to a separate associated AND gate 32, with the second input providing a "Compare Enable" signal which is active during the arrival time of the output address 26 in each time slot. The output from AND gate 32 is provided as a first input to a flip-flop (FF) 33, with the second input being a "Start" enable signal which resets each FF 33 at the beginning of a time slot so that FF 33 outputs a logic "1" to a first input of an associated AND gate 34. The second input to AND gate 34 is from the broadcast bus $14_i$ associated with that packet filter $20_i$.

In operation, at the start of every time slot, FF 33 in each packet filter outputs a logic "1" because of the "Start" control signal, and the path through each of the N packet filters 20 is open, initially allowing all arriving bits of the packets to pass through AND gate 34 to concentrator 21. As the address bits 26 for each arriving packet enter packet filters $20_i$, the address bits are compared bit-by-bit against the output address for that bus interface unit $15_i$ as received from shift register 31. If all bits of an output address 26 match the address bits provided by shift register 31, then EX-OR gate 30 will output a logic "0" at all times to the K input of FF 33. If, however, any one of the address bits 26 does not match the corresponding address bit from shift register 31, then EX-OR gate will output a logic "1" and enable AND gate 32 to output a logic "1" to the K input of FF 33. Such enable of the K input of FF 33 will cause a logic "0" to be transmitted to the input of AND gate 34 and inhibit the further progress of the packet through AND gate 34 to concentrator 21 of that bus interface unit 15. That is, the output of the filter $20_i$ is set at logic "0" for the remainder of the time slot.

By the end of the output address 26, the filter $20_i$ will have either blocked the packet, and hence also set its activity bit 27 to 0 since it follows the output address 26 in the packet format, or, if the address matched, allowed the packet to continue on to the associated concentrator 21. Where two or more packets arrive simultaneously on separate broadcast buses 14 for the same output $12_i$, then the associated packet filters 20 will provide simultaneous transmission of those packets through to the associated concentrator 21 in the bus interface unit $15_i$. It should be noted that even though a portion of the output address bits 26 of a blocked packet may pass through the filter 20 and into concentrator 21, these bits no longer serve any useful purpose and are ignored by the rest of bus interface $15_i$. It should also be noted that it is the time-slotted nature of switch 11, where the starting time of all packets are synchronized and defined by the system clock, which allows a simple design for packet filters 20.

All packets making it through the associated packet filters $20_1$ to $20_N$ enter the associated concentrator 21, which achieves an N-to-L concentration. Specifically, if k packets simultaneously arrive in a time slot for a given output, these k packets, after passing through concentrator 21, will emerge therefrom on outputs 1 to k, when $k \leq L$. If $k > L$, then all L outputs of concentrator 21 will have packets and k-L packets will be dropped or lost within concentrator 21. As with any packet switching system, packet loss is inevitable since it can be caused by transmission line errors (e.g., in the address portion of packet), buffer overflows, and network failures. In all cases, recovery is made possible by retransmission protocols, which, as the probability of losing packets in the network decreases, are more efficiently handled end-to-end rather than link-to-link. What must be assured, is that the probability of losing a packet within concentrator 21 is no greater than that of losing a packet elsewhere in the network.

Figure 5:
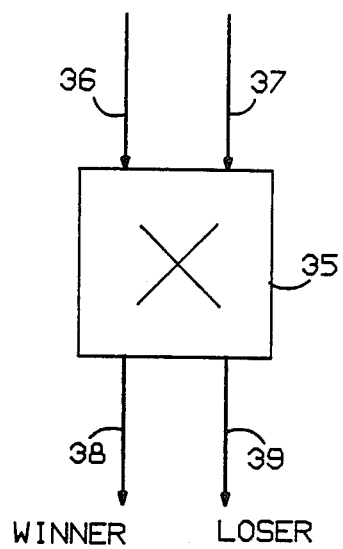
FIG. 5 shows a simple 2×2 contention switch forming the basic building block of the concentrator in each bus interface unit of FIG. 2.

The basic building block of concentrator 21 is a simple $2 \times 2$ contention switch 35 shown in FIG. 5. The two packets at inputs 36 and 37 contend for the "winner" output 38 according to their activity bits 27. If only one input has an arriving packet, as indicated by an activity bit = 1, it is routed to the winner, or left, output 38. If both inputs have arriving packets with activity bits = 1, the left input 36 is routed to the winner output 38 and the right input 37 is routed to the loser output 39. If both inputs have no arriving packets, one should not care except that the activity bit for both should remain a logic 0 at the switch outputs 38 and 39.

Figure 6:
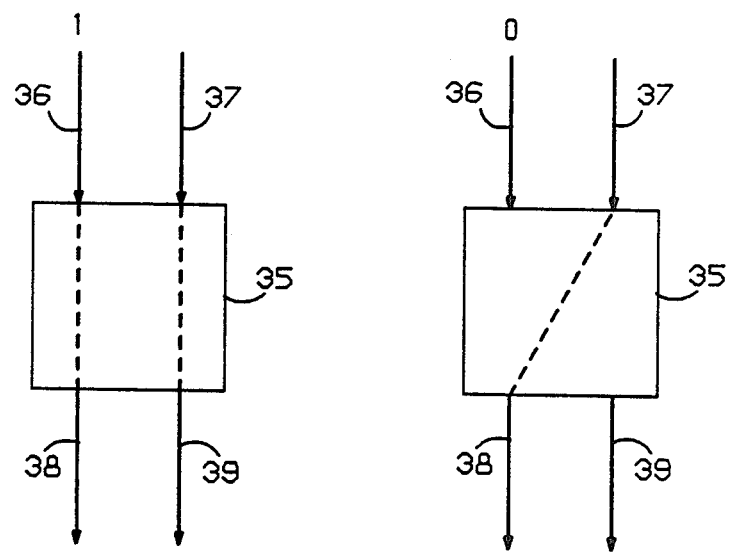
FIG. 6 illustrates the two states of a 2×2 contention switch of FIG. 5.

The above requirements are met by a switch 35 with the two states shown in FIG. 6. There, the switch 35 examines the activity bit 27 for only the packet arriving at the left input 36. If the activity bit = 1, the left input is routed to the winner output 38 and the right input is routed to the loser output 39. If the activity bit = 0 for the packet arriving at the left input 36, then the right input 37 is routed to the "winner" output 38 and no path is provided through the switch 35 for the left input 36. Such a switch can be realized with as few as 16 gates, and has a latency of at most one bit. Since the concentrator 21 can be designed for a lost packet rate of, for example, no greater than $10^{-6}$, the priority given to a packet on the left input 36 on each $2 \times 2$ switching element 35 is inconsequential. However, if this is of concern, the $2 \times 2$ switching element 35 can be designed so that it alternates between selecting the left and right inputs as winners when packets arrive at both inputs in the same time slot.

Figure 7:
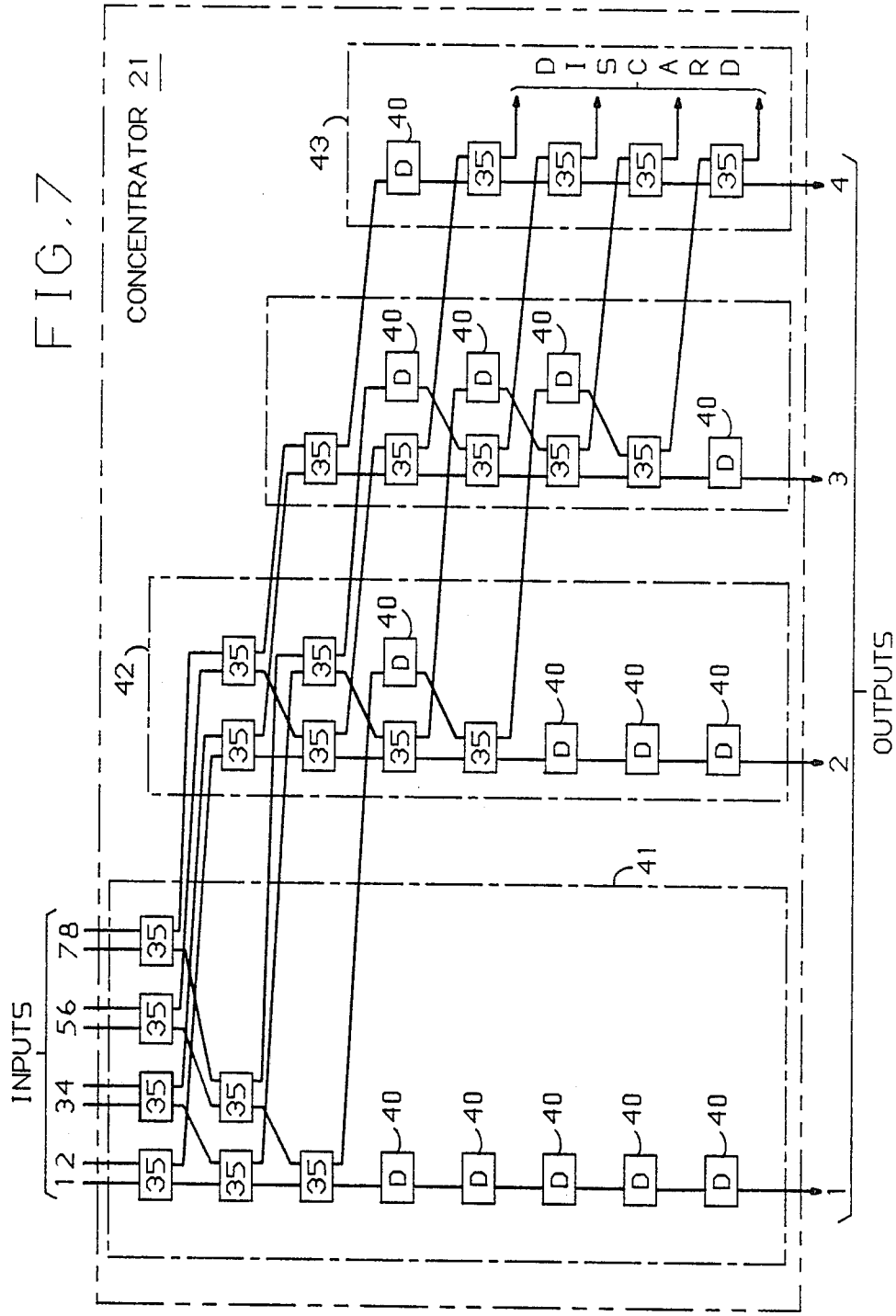
FIG. 7 is a block diagram of an exemplary 8 input/4 output concentrator for use in the bus interface unit of FIG. 2 using the contention switches of FIG. 5.

FIG. 7 shows an exemplary design of an 8-input, 4-output concentrator 21 composed of the simple $2 \times 2$ switching elements 35 of FIG. 5 and single-input/single-output 1-bit delay elements 40, indicated with a "D". At the input to concentrator 21, the N outputs from the associated packet filters 20 are paired and enter a row of N/2 switching elements 35. This may be viewed as the first round of a tournament with N players, where the winner of each match emerges from the left side of each of the $2 \times 2$ switching elements 35 and the loser at the right side. The N/2 winners from the first round advance to the second round where they compete in pairs as before using a row of N/4 switching elements 35. The winners in the second round advance to the third round and this continues until two compete for the championship; that is, the right to exit the first output of concentrator 21. It should be noted that if there is at least one packet arriving on an input to concentrator 21, a packet will exit the first output of concentrator 21.

A tournament with only a single tree-structured competition leading to a single winner is sometimes referred to as a single "knockout" tournament: lose one match and you are knocked out of the tournament. In a double "knockout" tournament, the N-1 losers from the first section 41 of competition compete in a second section 42, which produces a second place finisher and N-2 losers. As shown in FIG. 7, the losers from the first section 41 can begin competing in the second section 42 before competition is finished in first section 41. Whenever there is an odd number of players or packets in a round, one player or packet must wait and compete in a later round in a section. In concentrator 21, a simple delay element 40 serves this function.

Figure 8:
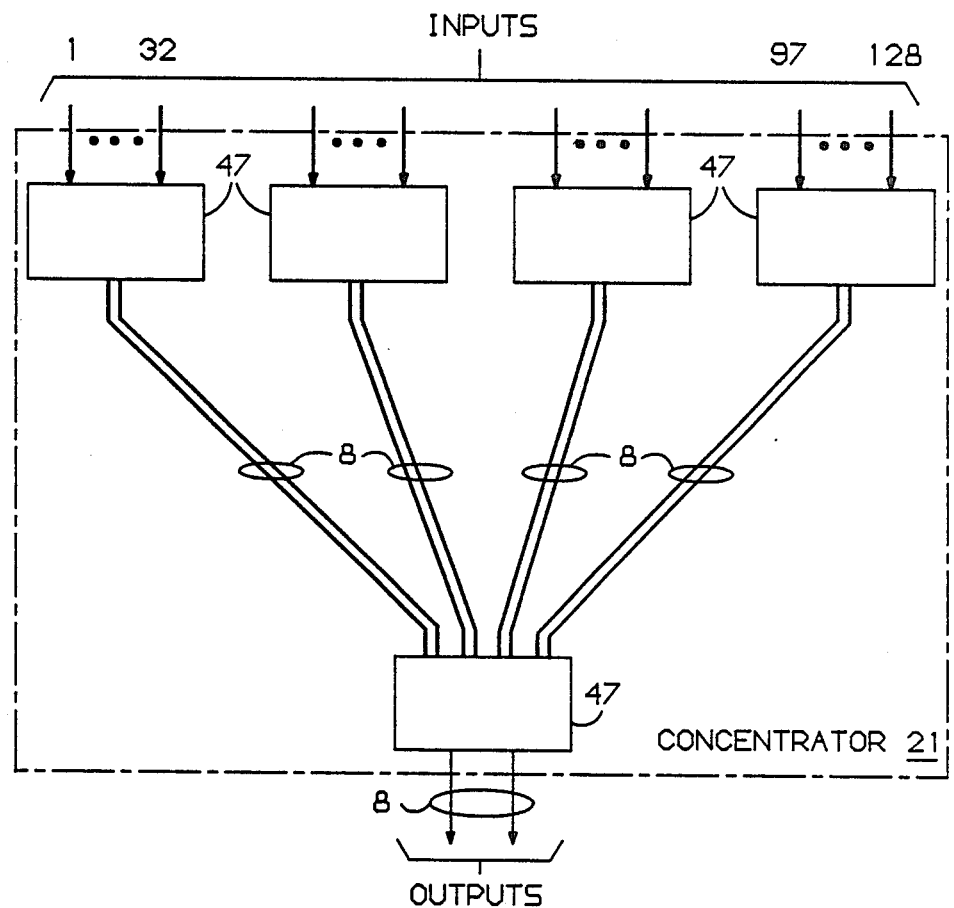
FIG. 8 is a block diagram of an exemplary 128-to-8 concentrator constructed from 32-to-8 concentrator chips for use in the concentrator in the bus interface unit of FIG. 2.

For a concentrator with N inputs and L outputs, there are L sections of competition, one for each output. In essence, a packet entering concentrator 21 is given L opportunities to exit through a concentrator output. A packet losing L times is "knocked out" of the competition and is discarded by concentrator 21 in the last section 43. For the above reasons, the present switching arrangement can be called a "Knockout" switch. In all cases, however, packets are only lost if more than L packets arrive in any one time slot which can be designed to be a low probability occurrence. For the example where $N \gg L$, each section of concentrator 21 contains approximately N switching elements 35 for a total concentrator complexity of 16NL gates. For $N=64$ and $L=8$, this corresponds to a relatively modest 8000 gates. FIG. 8 illustrates how several identical $N=32$, $L=8$ chips 47 can be interconnected to form a larger $N=128$, $L=8$ concentrator 21.

As will be shown, for values of N that are of interest, the complexity of packet buffering is greater by several orders of magnitude than all other components of the switch 11 combined. For this reason, the architecture of the bus interface unit 15 focuses, to the extent possible, on reducing the complexity of packet buffering. This is done first by using a concentrator 21 to reduce the number of inputs that must be buffered simultaneously. Second, through the use of a shared buffer 22, complete sharing of all packet buffer memory within a bus interface unit 15 is made possible. This is accomplished while still providing a first-in, first-out queuing discipline for the arriving packets and keeping the latency through a bus interface 15 to a minimum.

Figure 9:
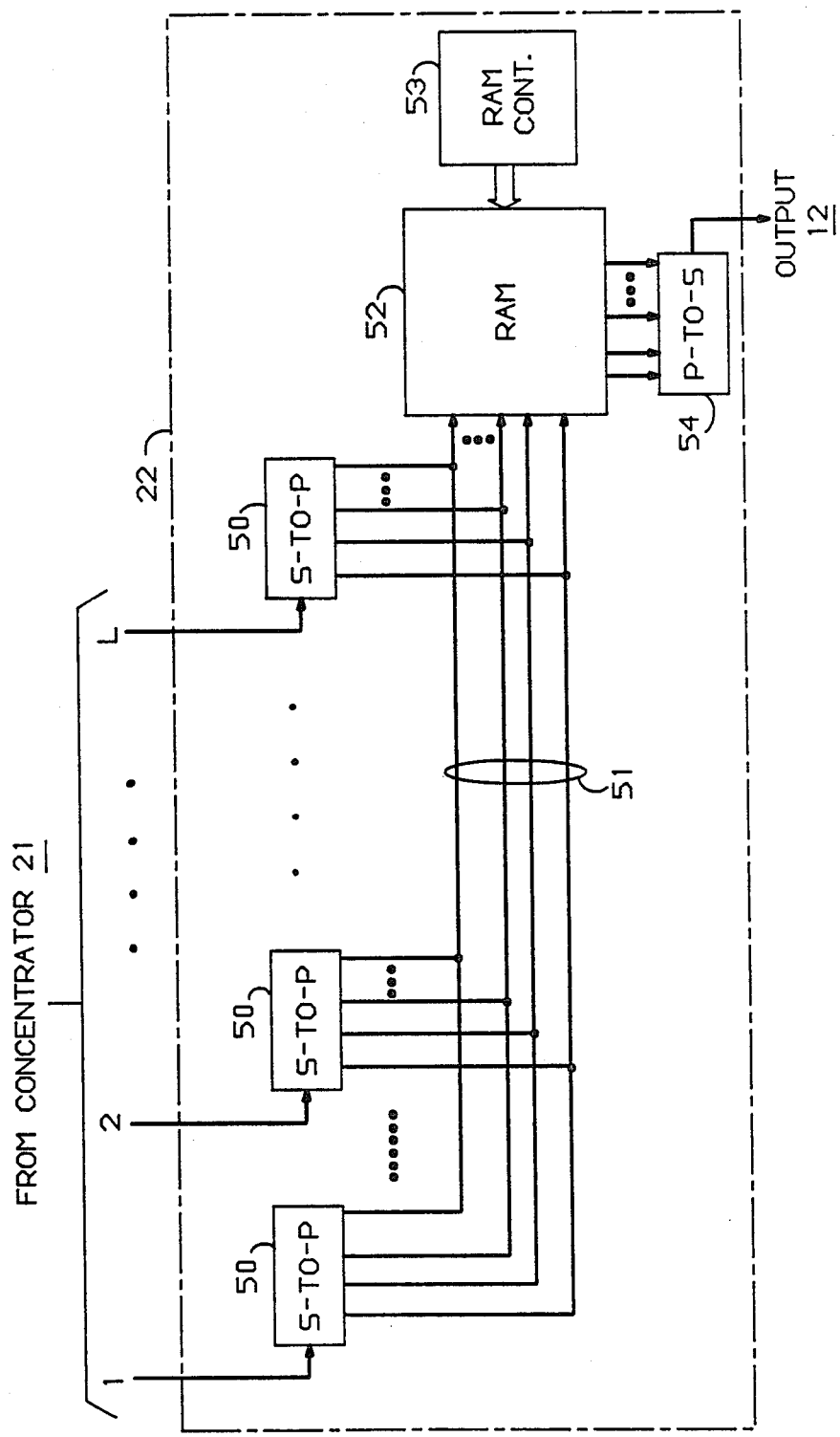
FIG. 9 shows an alternative exemplary block diagram of a shared buffer arrangement for the bus interface unit of FIG. 2.

Since in any given time slot, up to L packets can emerge from concentrator 21, the shared buffer 22 within bus interface unit 15 must be capable of storing up to L packets within a single time slot. FIG. 9 illustrates that this can be done by using a separate exemplary serial-to-parallel converter 50 to receive each output signal from concentrator 21, and then multiplex the L outputs from converters 50 on a common parallel memory bus 51 which is read by a random access memory (RAM) 52. A controller 53 for RAM 52 ensures that the individual parts of each packet multiplexed on memory bus 51 are appropriately stored in RAM 52 for later transmission via parallel-to-serial converter 54 onto the output 12 of bus interface unit 15. By making the memory bus 51 at least L lines wide, no single wire on memory bus 51 has to operate at a rate greater than the transmission rate of the switch inputs 10 and outputs 12. However, RAM 52 will be required to operate at the speed of the arriving data. This may present a problem, since memory performance is typically the bottleneck in most systems, with access speeds an order of magnitude slower than other components such as buses and gates. The throughput of the memory 52 can be increased by increasing the size of the stored word, which cannot be made larger than the size of the arriving packets, but this involves increasing the width of memory bus 51 and serial-to-parallel converters 50, which in turn adds to the overall latency through the bus interface unit 15.

To permit high-speed, low-latency operation of the present "Knockout" switch 11, the bus interface unit 15 uses L separate FIFO buffers $24_1$ to $24_L$ as shown in FIG. 2. A simple technique provides complete sharing of the L buffers 24 and at the same time provides a first-in, first-out queuing discipline for all packets arriving for an output $12_i$. The latter ensures fairness for access to the output and, more importantly, that successive packets arriving on an input 10 do not get out of sequence within switch 11.

Figure 10:
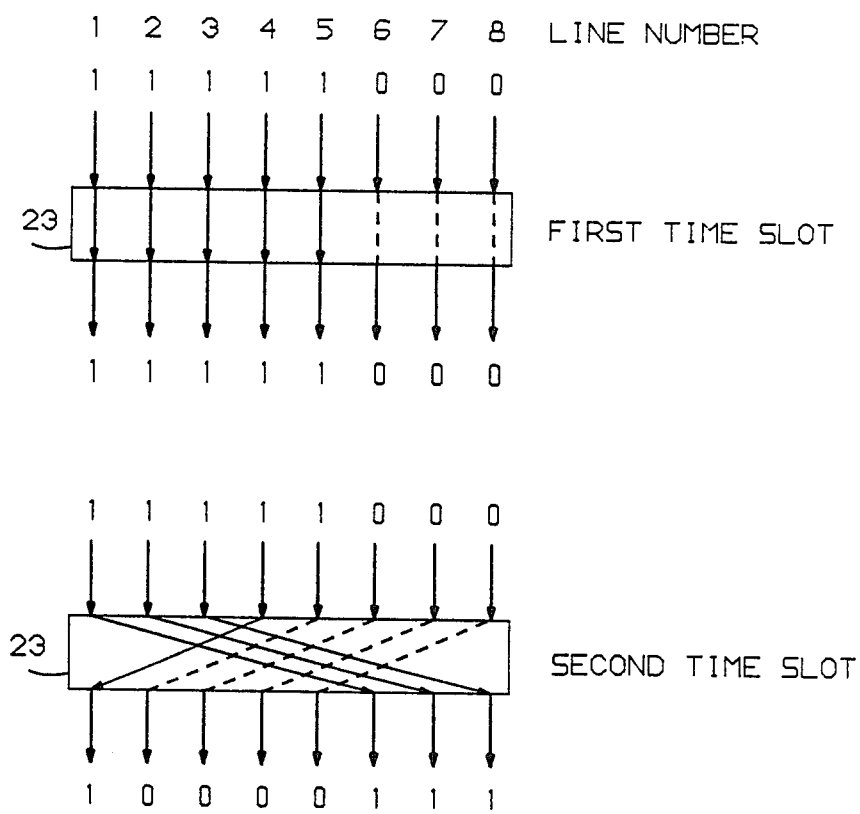
FIG. 10 illustrates a shifter function within the shared buffer in the bus interface unit of FIG. 2 to achieve a first-in, first-out packet queuing discipline.

As FIG. 2 shows, the L outputs from concentrator 21 first enter a shifter 23 having L inputs and L outputs. The purpose of shifter 23 is to provide a circular shift of the inputs to the outputs so that the L separate buffers 24 are filled in a cyclical manner. This is illustrated in FIG. 10 for $L=8$. There, in the first time slot, five packets arrive for the output and, after passing through concentrator 21, enter the first 5 inputs of shifter 23. For this time slot, shifter 23 simply routes the packets straight through to the first 5 outputs, from which they enter buffers $24_1$ to $24_5$. In the second time slot, four packets are shown arriving for the output and enter shifter 23 on inputs 1 to 4. Having left off in the previous time slot by filling buffer $24_5$, shifter 23 circular shifts the inputs by 5 outputs to the right so that the arriving 4 packets now enter packets buffers 24 associated with the 6, 7, 8 and 1 outputs of shifter 23. In the third time slot, the inputs are shifted one output to the right so that packet buffer $24_2$ will receive the next arriving packet from the first output of concentrator 21.

The flow of packets, stored in packet buffers $24_1$ to $24_L$, onto the output line $12_i$ from bus interface $15_i$ of switch 11 may be viewed as being controlled by a token. The buffer 24 holding the token has the right to transmit one packet in the next time slot, with buffer $24_1$ initially holding the token in the first time slot. If a buffer 24 is empty, it will hold the token indefinitely until a new packet arrives and is transmitted. After such transmission, the token is handed to the next buffer 24 and wraps around in a cyclical manner.

With the above described buffering means for storing and removing packets for the L buffers 24, the shared buffer 22 architecture has the following two characteristics. First, packets are stored in and removed from the L buffers 24 in a cyclical manner. At any time the number of stored packets in each buffer 24 does not differ by more than one among the L buffers. Buffer overflow only occurs when all L buffers 24 are full. Therefore, the equivalent of a single buffer is achieved and shared by all L outputs of concentrator 21. Second, the token is held by the buffer 24 with the largest number of stored packets, and the packet to be transmitted next is the one that has waited the longest in bus interface unit $15_i$. In cases where more than one buffer 24 fits the criteria, the lower numbered buffer 24 has priority since the transmission discipline starts at buffer $24_1$ and goes up in consecutive order. As a result, the shared buffer 22 architecture forms the equivalent of a single-server, first-in, first-out queue with L inputs. The total amount of buffering required in each bus interface unit 15 depends on the assumed model for packet arrivals and the restrictions on lost packets resulting from concentration and buffer overflows.

Figure 11:
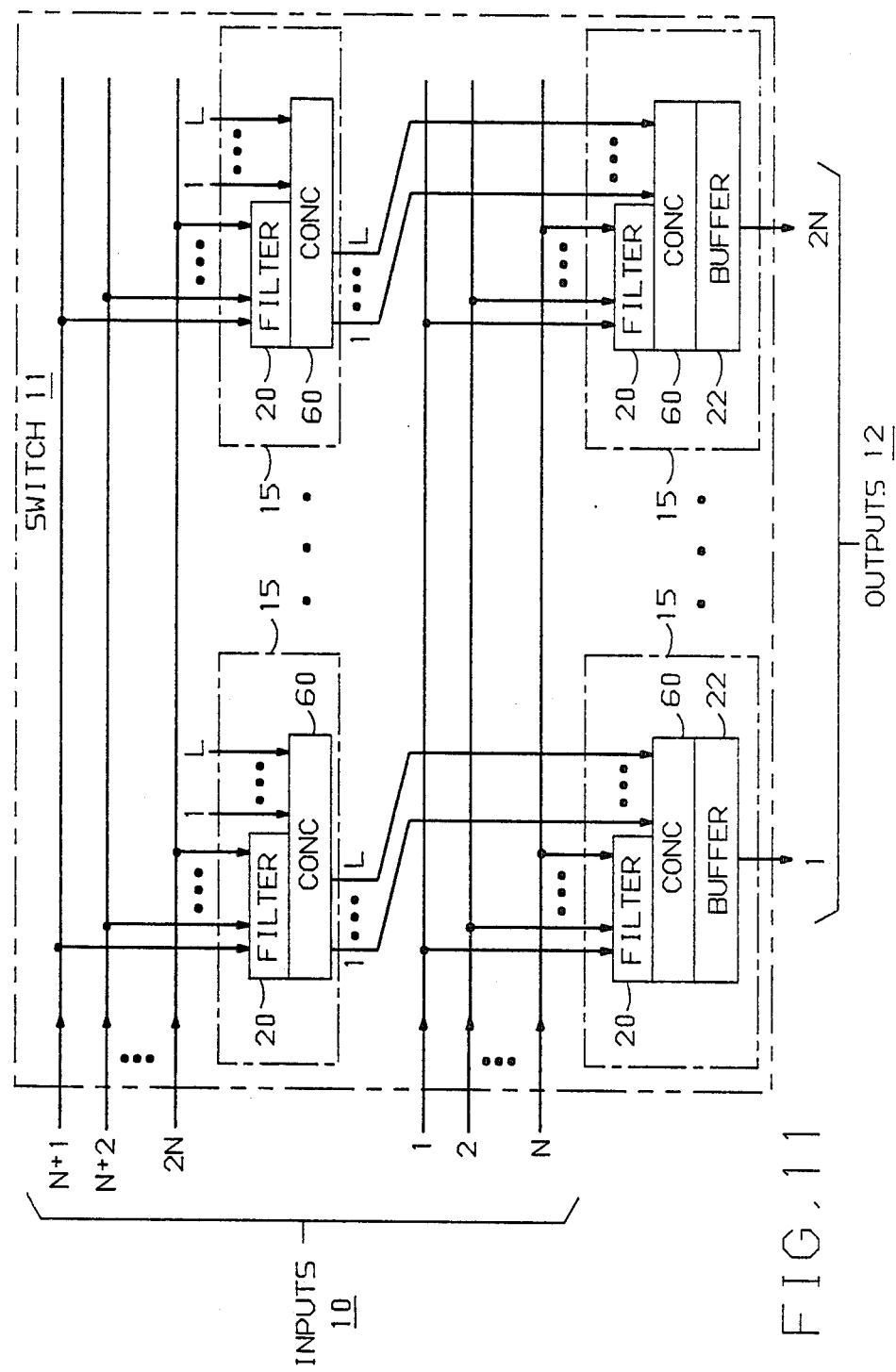
FIG. 11 illustrates, by a block diagram, how the present switching arrangement can be made to grow modularly.

The "Knockout" switch 11 can grow modularly from N-by-N to JN-by-JN, where $J=2,3,\ldots$. This is illustrated in FIG. 11 where each concentrator 60 in switch 11 is provided with L additional inputs for a total of N+L inputs and L outputs. The interface for each output in a JN-by-JN Knockout switch 11 comprises J separate N-bus interfaces daisy-chained together. Specifically, each of the J bus interfaces 15 for one switch output 12 contains a row of N packet filters 20 and an (N+L)-to-L concentrator 60, with only the first interface (for buses 1 to N) providing a switch 11 output 12 also containing the shared buffer structure 22 with shifter 23 and L FIFO packet buffers 24. The J individual components for each switch output 12 are connected together by coupling the L outputs of the concentrator 60 in the $j^{th}$ interface 15 (j=2,3, ..., J) to the L extra inputs on the concentrator 60 in the j-1$^{th}$ interface 15. In effect, a convenient way of growing the Knockout switch 11 is provided using a single (N+L)-to-L concentrator design and the same shared buffer 22, one for each output 12, independent of the size of switch 11. To grow modularly, the N broadcast buses 14 can be placed on an equipment backplane with the circuitry for each of the N input-output pairs placed on a single plug-in circuit card. Hence the switch can grow modularly by adding additional circuit cards.

It is to be understood that the above-described embodiments are simply illustrative of the principles of the invention. Various other modifications and changes may be made by those skilled in the art which will embody the principles of the invention and fall within the spirit and scope thereof. For example, it should also be noted that the interconnection architecture of the present "Knockout" switch 11 lends itself to broadcast and multicast features. Since every input 10 is available at the bus interface units 15 to every output 12, arriving packets can be addressed to, and received by, multiple outputs. Additionally, for the example where L=N, the concentrator 21 of FIG. 2 has N outputs which shifter 23 places into N packet buffers 24 in the manner as described hereinbefore to provide the first-in, first-out function to the associated output.

What is claimed is:

1. A switching arrangement employing decentralized control and distributed routing, the switching arrangement comprising:
    a plurality of N output terminals (12);
    a plurality of N input terminals (10) for receiving N separate input signals, each input signal comprising packets of information in a time division sequence; and
    switching means (11) disposed to receive up to N simultaneous packets of information from the N input terminals during a predetermined time period and for routing each of the packets of information to the destined one of the N output terminals in the received sequence, the switching means being responsive to the simultaneous reception of a plurality of packets of information destined for a particular output terminal for storing up to L of such packets of information for transmission to the destined output terminal on a first-in, first-out basis while discarding any simultaneously received packets of information above the number L, where L≦N.

2. A switching arrangement according to claim 1 wherein the switching means comprises:
    a plurality of N buses (14), each bus being connected to a separate one of the N input terminals for propagating an associated received input signal therealong; and
    a plurality of N bus interface units (15), each bus interface unit comprising
    an output connected to a separate one of the N output terminals of the switching arrangement;
    means (20) for detecting whether any of the N concurrent packets propagating on the plurality of N buses are destined for the associated output terminal of the switching arrangement, and for passing such packets in an unchanged state to separate outputs of the detecting and passing means;
    means (21) for concentrating the N concurrent output signals from the detecting and passing means into L concurrent output signals which appear at separate ones of L output terminals of the concentrating means, where L=N and the L output signals, during each time slot period of the time division sequence, include all of the packets destined for the associated output up to a maximum of L such packets; and
    buffering means (22) responsive to the L output signals from the concentrating means for temporarily storing the packets destined for the associated output and then transmitting such stored packets in a first-in, first-out sequence.

3. A switching arrangement according to claim 2 wherein the buffering means comprises:
    a plurality of L packet buffers (24) for temporarily storing the packets of information destined for the associated output of the switching arrangement in a circular manner among the L packet buffers, and for routing the packets stored in the plurality of L packet buffers in a circular manner onto the associated output terminal of the switching arrangement.

4. A switching arrangement according to claim 2 wherein the buffering means comprises:
    a shifter (23) including (a) L input terminals for receiving separate ones of the L concurrent output signals from the concentrating means during each time slot period of the time division sequence, (b) L output terminals, and (c) means for routing any packets received from the concentrating means, and destined for the associated output terminal of the switching arrangement, to each of the L output terminals in a circular manner; and
    a plurality of L packet buffers (24) connected to corresponding ones of the L output terminals of the shifter for temporarily storing only packets destined for the associated output of the switching arrangement, and for routing the packets stored in the plurality of L packet buffers in a circular manner onto the associated output terminal of the switching arrangement to provide the first-in, first-out sequence.

5. A switching arrangement according to claim 2, 3 or 4 wherein the concentrating means comprises
    means for concurrently outputting any packets that are destined for the associated output terminal of the switching arrangement from the L output terminals of the concentrating means in accordance with a selected order of output terminals during each time slot period of the time division sequence.

6. A switching arrangement according to claim 5 wherein the outputting means of the concentrating means comprises:
    a plurality of L contention sections coupled in sequence, each contention section including:

N-x inputs, where x=1,2, .. L and is the number of the immediately previous contention section in the sequence of L contention sections, and the N inputs of the first contention section receive the N outputs from the associated detecting and passing means, an output terminal for providing a separate one of the L concentrator output signals to the buffering means, and means for routing one of the N-x input signals to the output terminal of the contention section, and each of the remaining input signals to separate ones of the N-x inputs of the next contention section in the sequence of L contention sections, the signal routed to the output terminal of the contention section being one of the packet signals destined for the output of the associated bus interface unit when any of said packet signals appear as one of the input signals.

7. A switching arrangement according to claim 6 wherein the routing means in each contention section of the concentrating means comprises a plurality of approximately N-x-1 two-input, two-output contention switches (35) connected in a predetermined tree arrangement for selecting one of the input signals for transmission to the output terminal of the contention section and for transmitting the remaining input signals to the next contention section in the sequence of L contention sections; and at least one delay means for providing predetermined delays at inputs of predetermined ones of the contention switches while permitting the output signal at the L contention section to appear concurrently with the output signals from each of the other L-1 contention sections.

8. A switching arrangement according to claim 7 wherein each packet includes a multibit output address (26) indicative of a particular one of the N output terminals of the switching arrangement, and an activity bit (27) following the output address which includes a first logic state when the packet includes information to be transmitted and a second logic state when the packet is empty, the detecting and passing means comprising:

a plurality of N packet filters, each packet filter being connected to a separate one of the plurality of N buses and comprising:

means (30-32) for comparing the multibit output address in each packet received from the associated bus with the address of the associated output terminal of the switching arrangement during the time period for such received output address, and for generating a comparing means output signal which includes the first logic state when any one of the corresponding bits in the output addresses do not match, and the second logic state when the corresponding bits of the output addresses match; and means (33-34) responsive to the comparing means output signal for passing the bits of a packet as was received by the switching arrangement until the comparing means generates an output signal including the first logic state, and for transmitting the second logic state in each of the remaining bits in a packet, including the activity bit, once the comparing means generates an output signal including the first logic state; and each of the contention switches in the concentrating means looks at the activity bit in the packet arriving at each contention switch input to determine if the packet is destined for the associated output of the switching arrangement.

9. A switching arrangement according to claim 2, 3 or 4 wherein each packet includes a multibit output address (26) indicative of a particular one of the N output terminals of the switching arrangement, and an activity bit (27) following the output address which includes a first logic state when the packet includes information to be transmitted and a second logic state when the packet is empty, the detecting and passing means comprising:

a plurality of N packet filters (20), each packet filter being connected to a separate one of the plurality of N buses and comprising:

means (30-32) for comparing the multibit output address in each packet received from the associated bus with the address of the associated output terminal of the switching arrangement during the time period for such received output address, and for generating a comparing means output signal which includes the first logic state when any one of the corresponding bits in the compared output addresses do not match, and the second logic state when the corresponding bits of the compared output address match; and means (33-34) responsive to the comparing means output signal for passing the bits of a packet as received by the switching arrangement until the comparing means generates an output signal including the first logic state, and for transmitting the second logic state for each of the remaining bits in a packet, including the activity bit, once the comparing means generates an output signal including the first logic state; and the concentrating means looks at the activity bit in each received packet from the detecting and passing means for determining if the packet is in contention for one of the L output signals of the concentrating means.

10. A first-in, first-out buffering arrangement comprising:

an output terminal;

N input terminals for receiving up to N separate concurrent packets of information during each time period of a time division sequence of time periods;

means connected to the N input terminals for detecting which of the N received concurrent packets of information during each time period are destined for the output terminal, and for passing each of such packets in an unchanged state to a separate one of N outputs of the detecting and passing means;

means for concentrating the N concurrent outputs appearing at separate ones of the N outputs of the detecting and passing means into L concurrent output signals which appear at separate ones of L output terminal of the concentrating means, where $L \leq N$ and $L > 1$, and the L output signals, during each time period of the time division sequence of time periods, include all of the paokets destined for the buffering arrangement output terminal up to a maximum of L such packets of information; and buffer means responsive to packets of information concurrently appearing at the L outputs of the concentrating means and for temporarily storing the packets of information in separate storage locations and then transmitting such stored packets of information in a first-in, first-out sequence to the buffering arrangement output terminal, the buffer means comprising a plurality of L packet buffers, where each packet buffer includes a plurality of storage locations and is coupled at an input thereof to a separate one of the L outputs from the concentrating means, for temporarily storing the packets of information from the concentrating means in a circular manner among the L packets buffers, and for routing the packets stored in the plurality of L packet buffers in a circular manner to the buffering arrangement output terminal.

11. A buffering arrangement according to claim 10 wherein the buffer means further comprises:

a shifter, disposed between the concentrating means and the plurality of packet buffers, the shifter including (a) L input terminals for receiving separate ones of the L concurrent output signals from the concentrating means during each time period of the time division sequence of time periods, (b) L output terminals where each of the L output terminals is connected to a separate input of the plurality of L packet buffers, and (c) means for routing any packets received from the concentrating means, and destined for the buffering arrangement output terminal, to each of the L output terminals in circular manner.

12. A buffering arrangement according to claim 10 or 11 wherein the concentrating means comprises:

means for concurrently outputting any packets of information that are destined for the buffering arrangement output terminal from the L output terminals of the concentrating means in accordance with a selected order of output terminals during each time period of the time division sequence of time periods.

* * * * *

UNITED STATES PATENT AND TRADEMARK OFFICE
CERTIFICATE OF CORRECTION

PATENT NO. : 4,760,570

DATED : July 26, 1988

INVENTOR(S) : Anthony Acampora, Michael G. Hluchyj, Yu S. Yeh

It is certified that error appears in the above-identified patent and that said Letters Patent is hereby corrected as shown below:

Column 10, line 17, delete $L=N$ and insert $L \leq N$.

Signed and Sealed this

Seventeenth Day of January, 1989

Attest:

DONALD J. QUIGG

*Attesting Officer*  *Commissioner of Patents and Trademarks*